(12) United States Patent
Sievers

(10) Patent No.: US 6,873,398 B2
(45) Date of Patent: Mar. 29, 2005

(54) METHOD AND APPARATUS FOR MULTI-TRACK IMAGING USING SINGLE-MODE BEAMS AND DIFFRACTION-LIMITED OPTICS

(75) Inventor: Wolfgang Sievers, Kremperheide (DE)

(73) Assignee: Esko-Graphics A/S, Ballerup (DK)

(*) Notice: Subject to any disclaimer, the term of this patent is extended or adjusted under 35 U.S.C. 154(b) by 0 days.

(21) Appl. No.: 10/442,666

(22) Filed: May 21, 2003

(65) Prior Publication Data

US 2004/0233408 A1 Nov. 25, 2004

(51) Int. Cl.[7] .................. G03B 27/44; G03B 27/54; G03B 27/58
(52) U.S. Cl. .................. 355/47; 355/46; 355/67
(58) Field of Search .................. 355/46, 47, 49, 355/67, 77

(56) References Cited

U.S. PATENT DOCUMENTS

| | | | |
|---|---|---|---|
| 4,093,964 A | * 6/1978 | Aughton | 358/302 |
| 4,201,455 A | 5/1980 | Vadasz et al. | 350/358 |
| 4,541,712 A | * 9/1985 | Whitney | 355/53 |
| 4,796,038 A | * 1/1989 | Allen et al. | 396/548 |
| 5,311,360 A | 5/1994 | Bloom et al. | 359/572 |

(Continued)

FOREIGN PATENT DOCUMENTS

| | | | | |
|---|---|---|---|---|
| WO | WO 95/05944 | 3/1995 | | B41J/2/47 |
| WO | WO 98/20475 | 5/1998 | | G09G/3/00 |
| WO | WO 02/05012 A2 | 1/2002 | | |

OTHER PUBLICATIONS

Corrigan, R. W., Amm D. T., Alioshin P.A., Staker B., LeHoty D.A., Gross K. P., Lang B. R. "Calibration of a Scanned Linear Grating Light Valve Projection System." May 18, 1999. Silicon Light Machines, Sunnyvale, CA. URL: ttp://www.siliconlight.com/webpdf/sid99.pdf.

(Continued)

Primary Examiner—Rodney Fuller
(74) Attorney, Agent, or Firm—Dov Rosenfeld Inventek

(57) ABSTRACT

An imaging apparatus includes a laser to generate a single-mode laser beam of energy, a multichannel spatial light modulator (SLM) accepting a plurality of modulating signals, and a beam multiplier between the radiation source and the SLM. The multiplier accepts the beam and generates from that beam a plurality of beams directed onto the SLM. The beams from the beam multiplier illuminate the active region of the SLM such that the SLM generates a plurality of modulated beams modulated according to the modulating signals. An optical subsystem is located between the SLM and an imaging plane including at least one optical element focusing the modulated beams onto the plane on which recording medium is placed to permanently mark the recording medium in response to incidence of such imaging radiation. Each beam from the SLM is substantially single-mode such that the optical subsystem can be designed using diffraction-limited optics.

35 Claims, 6 Drawing Sheets

U.S. PATENT DOCUMENTS

| | | | | |
|---|---|---|---|---|
| 5,386,221 A | * | 1/1995 | Allen et al. | 347/239 |
| 5,459,610 A | | 10/1995 | Bloom et al. | 359/572 |
| 5,517,359 A | | 5/1996 | Gelbart | 359/623 |
| 5,677,783 A | | 10/1997 | Bloom et al. | 359/224 |
| 5,745,153 A | | 4/1998 | Kessler et al. | 347/241 |
| 5,808,797 A | | 9/1998 | Bloom et al. | 359/572 |
| 5,828,501 A | | 10/1998 | Menard et al. | 395/819 |
| 5,841,579 A | | 11/1998 | Bloom et al. | 359/572 |
| 5,912,458 A | | 6/1999 | Squires et al. | 250/234 |
| 5,920,518 A | | 7/1999 | Harrison et al. | 365/233 |
| 5,949,570 A | | 9/1999 | Shiono et al. | 359/291 |
| 5,982,553 A | | 11/1999 | Bloom et al. | 359/627 |
| 5,995,475 A | | 11/1999 | Gelbart | 369/112 |
| 5,999,319 A | | 12/1999 | Castracane | 359/573 |
| 6,014,257 A | | 1/2000 | Furlani et al. | 359/573 |
| 6,031,652 A | | 2/2000 | Furlani et al. | 359/224 |
| 6,208,369 B1 | * | 3/2001 | Oren et al. | 347/244 |
| 6,430,136 B1 | | 8/2002 | Gelbart | 369/112.01 |
| 6,621,511 B2 | * | 9/2003 | Shibayama et al. | 347/239 |
| 6,724,002 B2 | * | 4/2004 | Mankos et al. | 250/492.24 |
| 2002/0015230 A1 | | 2/2002 | Pilossof et al. | 359/558 |
| 2002/0060732 A1 | | 5/2002 | Miyagawa et al. | 347/239 |
| 2002/0075378 A1 | | 6/2002 | Gelbart | 347/241 |
| 2002/0109843 A1 | * | 8/2002 | Ehsani et al. | 356/400 |
| 2002/0135857 A1 | | 9/2002 | Fitzpatrick et al. | 359/291 |
| 2002/0140801 A1 | | 10/2002 | Kubota | 347/239 |
| 2003/0019854 A1 | * | 1/2003 | Gross et al. | 219/121.73 |
| 2003/0174255 A1 | * | 9/2003 | Lee et al. | 348/744 |

OTHER PUBLICATIONS

"Platesetting solution uses novel optical MEMS." Apr. 15, 2002. Cypress semiconductor, Hertfordshire, United Kingdom. URL: http://www.electronicstalk.com/news/cyp/cyp148.html.

"PYL Series: 5,10, 50, and 100 Watts: Single–Mode, CW Ytterbium Fiber Lasers (OEM Units)." Jan. 2002. IPG Photonics, Oxford, MA. URL: http://www.ipgphotonics.com/html/8_all_products.cfm?searchterm×Pyl_Series.

"About Diffractive Optics." 2002. Gentec–EO, Palto Alto, CA. URL: http://www.gentec-eo.com/en/pdf/ab_do_1r.pdf.

Amm, D. T., Corrigan, R.W. "Grating Light Valve Technology: Update and Novel Applications." May 19, 1998. Silicon Light Machines, Sunnyvale, CA. URL: http://www.siliconlight.com/webpdf/sid98.pdf.

Bloom, D.M. "The Grating Light Valve: revolutionizing display technology." Silicon Light Machines, Sunnyvale, CA. URL: http://www.siliconlight.com/webpdf/pw97.pdf.

Grossinger, I. "Beam Multiplication: Application Note." Holo/Or Ltd., Kiryat Weizmann, Rehovot, Israel. URL: http://www.holoor.co.il.

Grossing, I. "New Applications of Diffractive Optical Elements." The 10th Meeting on Optical Engineering in Israel, Nov. 1996. URL: http://www.holoor.co.il.

"Micro Spatial Light Modulators Brochure." Boston Micromachines, Watertown, MA. URL: http://www.bostonmicromachines.com/downloads/SLM_Brochure.pdf.

"Do you know Acousto–optics: AO Application Notes." pp. 7–13. Opto–Electronic, St–Rémy–Lès–Chevreuse, France. URL: http://www.a-a.fr/Documentation/AO_Doc.pdf.

"1–D vs. 2–D vs. 3–d MEMS Optical Switch Architectures." Mar. 2003. Network Photonics, Boulder, Co. Downloaded from company website networkphotonics.com. Company no longer in business as of Apr. 2003.

* cited by examiner

METHOD AND APPARATUS FOR MULTI-TRACK IMAGING USING SINGLE-MODE BEAMS AND DIFFRACTION-LIMITED OPTICS

BACKGROUND

This invention is related to imaging multiple tracks simultaneously using a beam multiplier to form a set of single-mode beams and a spatial light modulator (SLM) to modulate the single-mode beams to form the tracks, such that diffraction-limited optics can be used to focus the beams.

It is known to use a multichannel modulator to simultaneously form a plurality of beams to form an image on a recording medium. Such multichannel imaging is particularly advantageous in the printing industry for film and plate imaging.

Recently, the introduction of SLMs using Micro Electro-mechanical Systems (MEMs) has provided for imaging using a relatively large number of individually modulated beams. MEMS are made of arrays or matrixes of reflective elements (mirrors) made of micromachined silicon that can be steered by electrostatic forces.

A relatively large number of modulated beams enables lowering the rotational speed of a polygon in the case of a stationary internal drum imaging system using a polygon, and lowering the rotational speed of a drum in the case of an external drum imaging system.

Multichannel imaging is also useful in other fields of application.

FIG. 1A shows in simplified form one example of a prior art imaging system that uses a line-shaped laser diode source 101 and a lens to illuminate a multichannel spatial light modulator (SLM) 105. The SLM 105 separates the beam illuminating the SLM into a plurality of individually modulated beams 106 that are imaged using an optical system-shown in simple form as lens 107 onto a light sensitive surface on an image plane 109 that, for example, might be the inside surface of an internal drum imager, or the outside surface of an external drum imager. Not shown are the plurality of signals that modulate the plurality of beams, or the mechanism used to provide relative motion between the beams on the imaging plane, and the light sensitive surface on which an image is being formed. The relative motion may be provided by moving the beam, e.g., using a rotating polygon in an internal drum scanner, or by moving the radiation-sensitive surface of the recording medium, e.g., rotating the drum of an external drum scanner.

FIG. 1B shows in simplified form another example of a prior art imaging system, this one using an array of laser diode sources 111 and an array of lenslets 113 to illuminate an SLM 115, replacing the single line-shaped source 101 and lens of FIG. 1A. The remainder of the system is similar to that of FIG. 1A. That is, SLM 115 separates the beams illuminating the SLM into a plurality of individually modulated beams 116 that are imaged using an optical system 117 onto a light sensitive surface on an image plane 119. FIG. 1B also does not show the mechanism for providing relative motion between the modulated beams hitting the light sensitive material and the light sensitive material itself.

Prior art systems also are known that use a large area laser beam source rather than a line-shaped source. In such a case, the SLM is a two-dimensional array of light modulators.

One of the drawbacks of the prior art using either an array of laser diodes or a large area or line-shaped laser diode source is that the beam is of relatively poor quality. For example, for line-shaped and large-area sources, also known as multimode sources, there is non-diffraction-limited divergence in the direction of the elongated axis. It is known that the design of optical delivery systems for laser systems is highly dependent on the laser's beam quality. The beam quality, given by the parameter $M^2$, ranges from 1 for a diffraction-limited TEM00 Gaussian laser beam, to several hundred for a distorted, poor quality beam. As a result, the optics of a prior art imaging system needs to be carefully designed with tight tolerances and be of high quality. This increasing the system costs and decreasing the reliability. Often, for example, an autofocus system is used to overcome the shallow depth of focus of the optical system, e.g., lens 107 or 117, used in prior art systems.

It is desirable to use SLMs to provide for multichannel imaging, yet it is also desirable to maintain diffraction-limited beam properties. This leads to increased depth of focus and enhanced imaging quality in comparison to conventional imaging optics involving SLMs.

SUMMARY

Described herein is a method and apparatus that provide multichannel imaging and that allow using diffraction-limited optics. The imaging apparatus includes a laser beam source to generate single-mode laser beam of energy, a multichannel spatial light modulator (SLM) accepting a plurality of modulating signals, and a beam multiplier between the radiation source and the SLM. The beam multiplier accepts the beam generated by the source and generates from that beam a plurality of beams directed onto the SLM. The beams from the beam multiplier illuminate the active region of the SLM such that the SLM generates a plurality of modulated beams modulated according to the modulating signals.

The system further includes an optical subsystem located between the SLM and an imaging plane that includes at least one optical element to focus the modulated beams onto an imaging plane. A recording medium sensitive to imaging radiation from the source is placed at the imaging plane. The recording medium is capable of being permanently marked in response to incidence of such imaging radiation.

The beams generated by the SLM are each substantially a single-mode beam such that the first optical subsystem may be designed using diffraction-limited optics.

BRIEF DESCRIPTION OF THE DRAWINGS

FIG. 1A shows a system that uses a line-shaped laser beam source while FIG. 1B shown a system using a source that includes an array of laser diodes and an array of lenslets.

DETAILED DESCRIPTION

Described herein is a multichannel imaging system that uses an initial single-mode laser beam and generates multiple single-mode beams from the initial beam to illuminate a multichannel SLM. Illuminating the SLM by multiple single-mode beams generated modulated single-mode beams and allows diffraction-limited optics to be used to form multiple tracks on a radiation-sensitive surface of a recording medium.

Figure 1B:
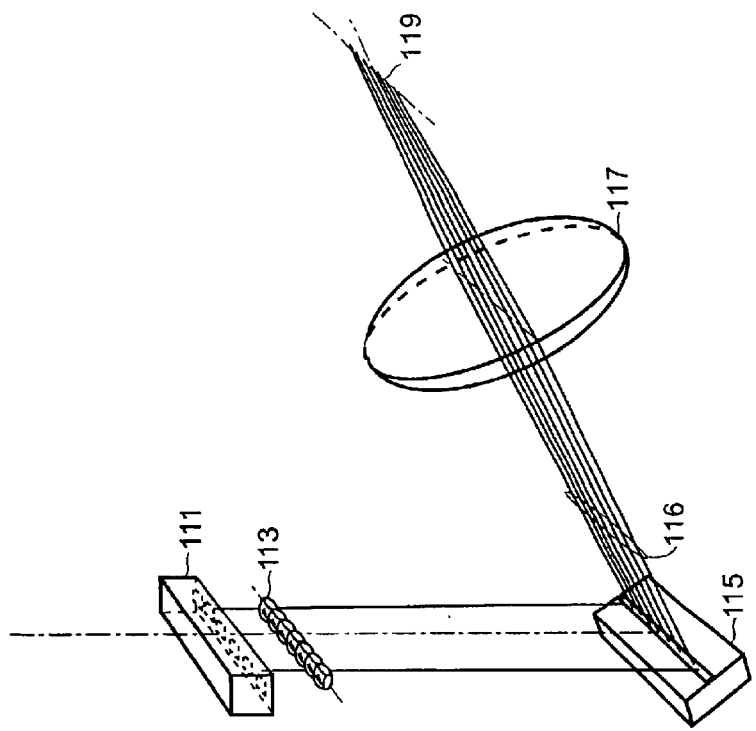
FIGS. 1A and 1B each show a prior art multichannel imaging system.
Figure 1A:
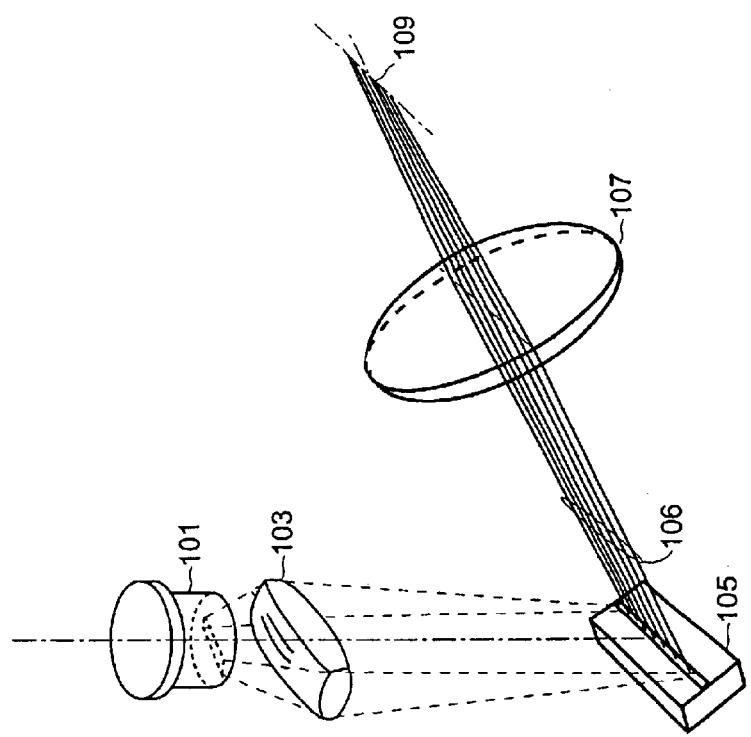
Figure 2:
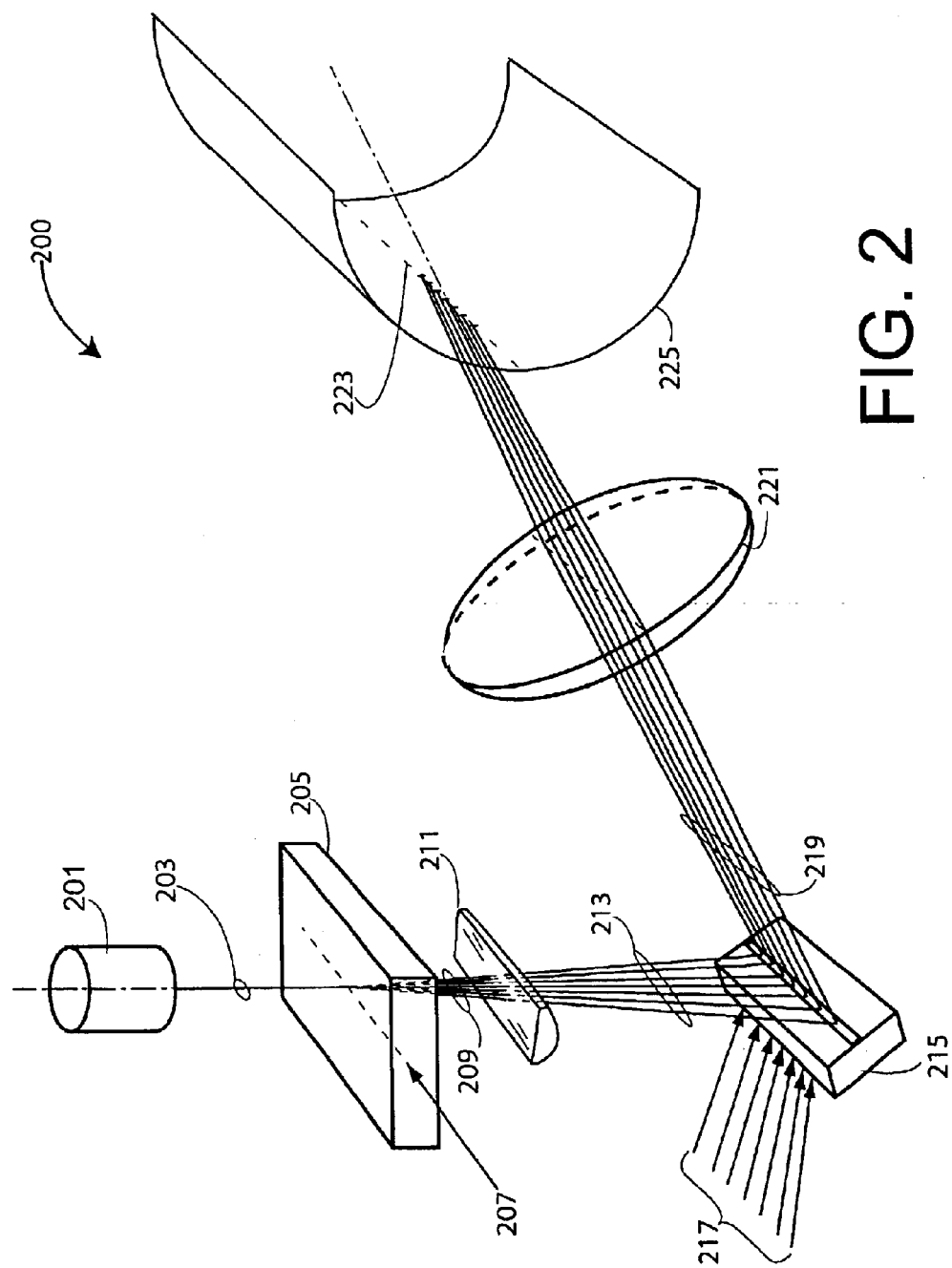
FIG. 2 shows a simplified diagram of an apparatus embodiment of the invention.

FIG. 2 shows one embodiment of an imaging system 200. The system of FIG. 2 is shown in a simplified form to describe the inventive aspects and not mask such aspects with unnecessary detail. Furthermore, dimensions and angle proportions are strongly exaggerated. The system 200 includes a laser beam source 201 to generate a single-mode laser beam of energy 203, a multichannel spatial light modulator (SLM) 215 accepting a plurality of modulating signals 217, and a beam multiplier 205 between the radiation source 201 and the SLM 215. The beam multiplier accepts the beam 203 and generates from beam 203 a plurality of beams 209 directed onto the SLM 215 to illuminate the active region of the SLM such that SLM 215 generates a plurality of modulated beams 219 each modulated according to one of the modulating signals 217.

The system further includes an optical focusing subsystem located between the SLM and an imaging plane 223. The focusing subsystem includes at least one optical element, shown as lens 221 to focus the modulated beams 219 onto the imaging plane. A recording medium 225 sensitive to imaging radiation from the source 201 is placed at the imaging plane. The recording medium is capable of being permanently marked in response to incidence of such imaging radiation.

The beams generated by the SLM are each substantially a single-mode beam such that the first optical subsystem may be designed using diffraction-limited optics.

Figure 5:
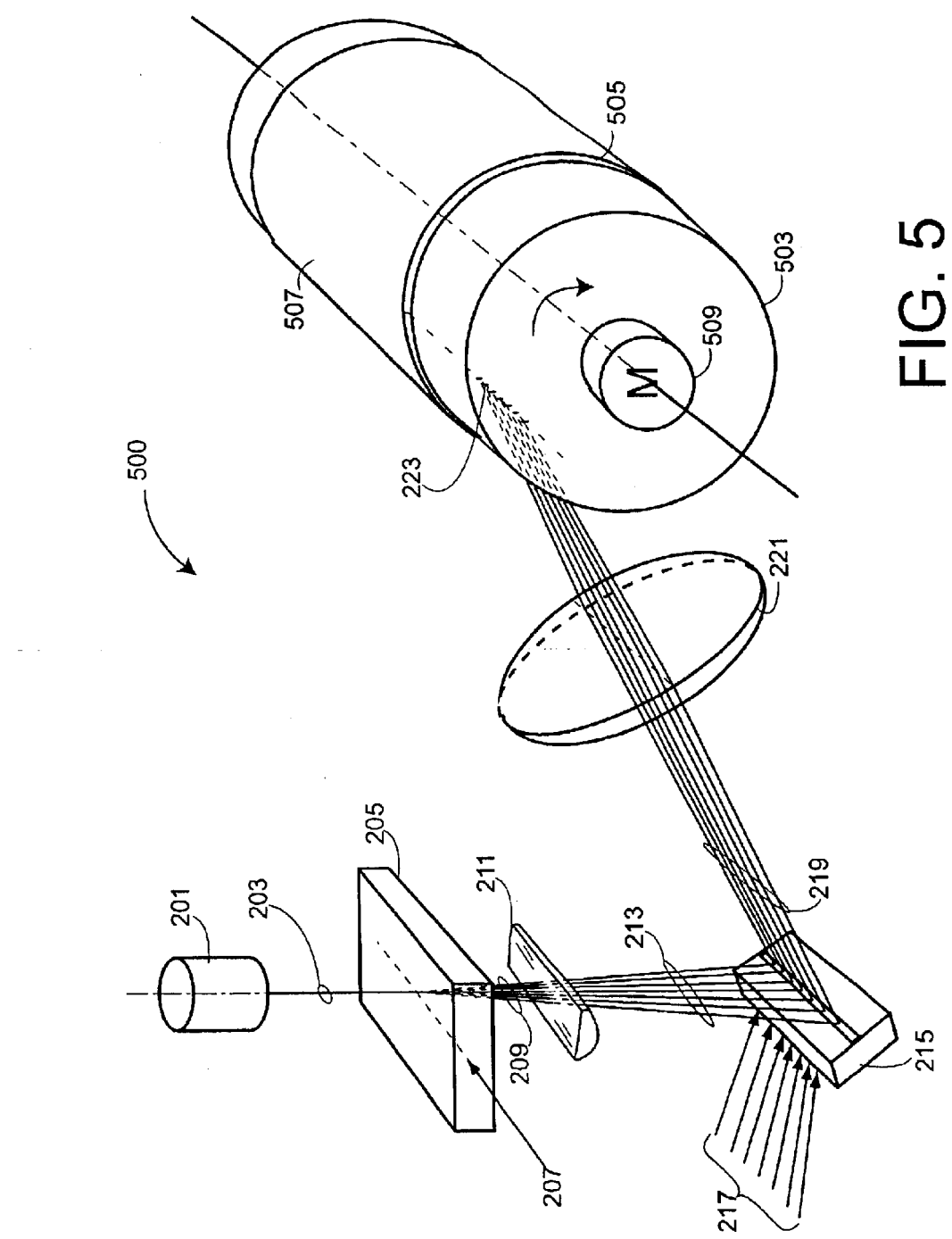
FIG. 5 shows one embodiment of an imaging system that includes a rotating drum to generate relative motion between the focussed beams and the recording medium.
Figure 6:
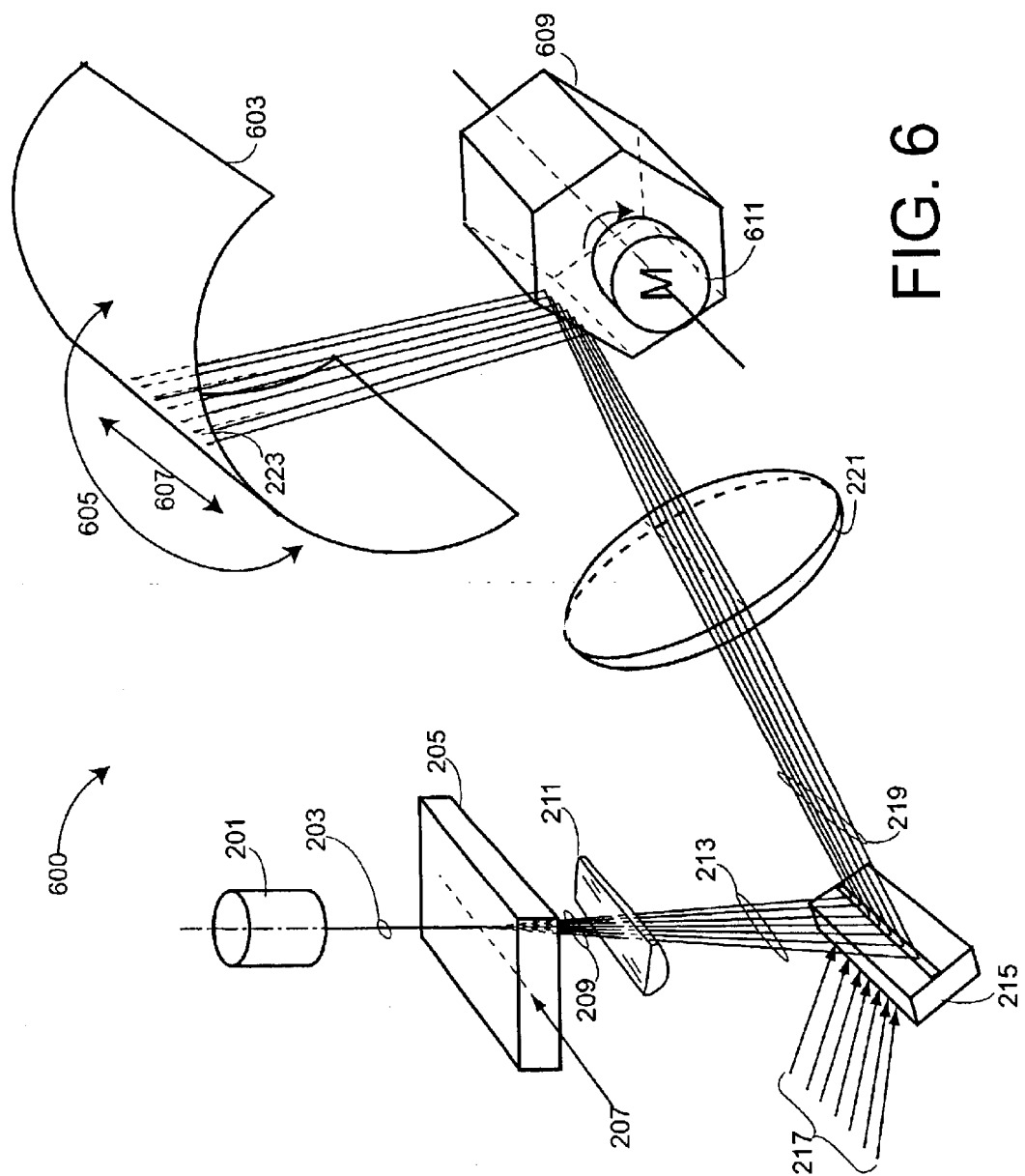
FIG. 6 shows one embodiment of an imaging system that includes a platen having an inwardly curving surface on which the recording medium is placed and a rotating polygon to generate relative motion between the focussed beams and the recording medium.

Not shown in FIG. 2 is a mechanism to provide relative motion between the modulated beams 223 incident on the imaging plane and the recording medium 225. With such a mechanism, the apparatus simultaneously records a plurality of data tracks on the recording medium. FIGS. 5 and 6 each show a system that includes such a relative motion mechanism, one system including a rotating external drum and the second system including a rotating polygon that scans beams across an internal curved surface.

In one embodiment, the SLM is a reflective device that includes a plurality of reflective elements distributed along a long axis. In particular, the SLM is a MEM device with reflective elements constructed using micromachined silicon and distributed along a long axis.

One embodiment of system 200 includes a second optical subsystem 211 between the laser beam source 201 and the SLM 215 to elongate the cross-sectional distribution of each of the beams 209 in the direction of the SLM's long axis. This is done so that more of the energy of the beams is directed towards the optically active part of the SLM than in the case of not so elongating the beams' cross-sections. The result is a set of beams 213 each having a cross-sectional distribution with a short axis and a long axis, e.g., an elliptically shaped distribution. Each beam's long axis is parallel to the SLM's long axis. The beams 213 are distributed in the direction of the SLM's long axes.

Figure 3A:
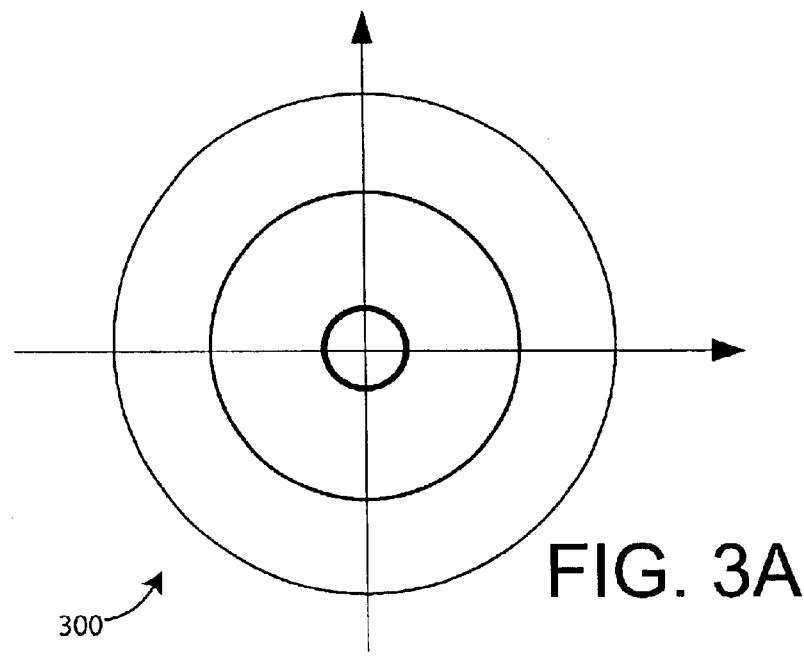
FIG. 3A shown a cross-sectional representation of a circularly symmetric Gaussian laser beam such as for example one of the beams exiting the beam multiplication device shown in FIG. 2.
Figure 3B:
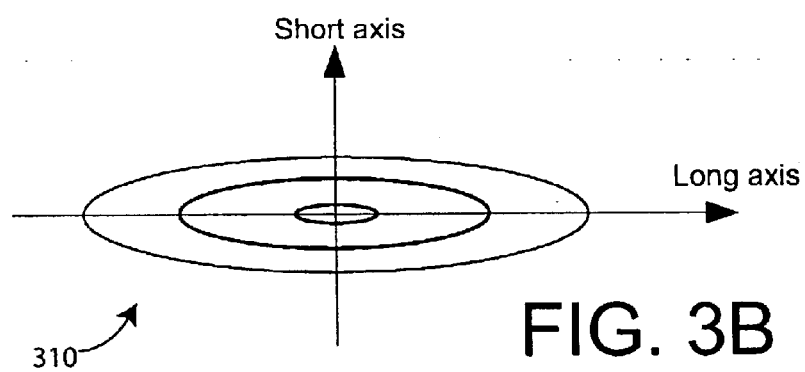
FIGS. 3B and 3C show a cross-sectional and perspective representation of a Gaussian beam having an elliptical cross section, such as for example one of the beams incident on the SLM shown in FIG. 2.
Figure 3C:
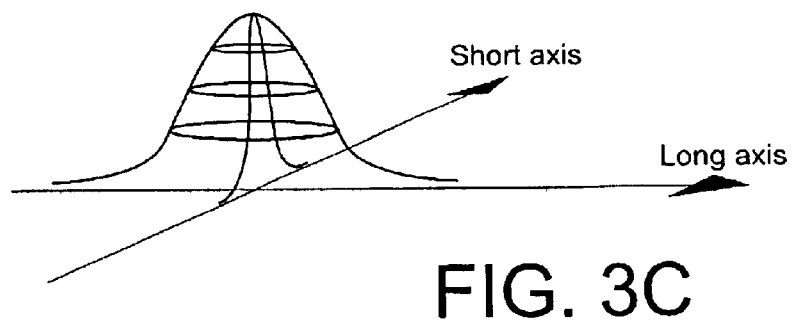

In one embodiment, the beam generated by single-mode laser beam source 201 has a circularly symmetric Gaussian cross-sectional distribution. FIG. 3A shows a representation 300 of such a cross-sectional distribution. FIG. 3B shows the representation 310 of the cross-sectional distribution of one of the beams 213 incident on the SLM 215 after passing through the beam multiplier 205 and the second optical subsystem 211 that elongates the beam's cross-sectional distribution, The beam's cross section is approximately elliptically shaped. FIG. 3C shows another representation of the elliptically shaped cross-sectional distribution.

In one version, the second optical subsystem 211 includes at least one cylindrical lens. In another version, the second optical subsystem includes an array of lenslets that together cause elongation of the cross-sectional distributions of the beams 209.

The distance between the focussed beams on the imaging plane 223 may be varied by changing the angles between the beams from the beam multiplier 205.

In conventional SLM optics, each beam is incident on a single element, e.g., a reflective element of an SLM. In such a case, the resolution of the system can only be changed in steps that correspond to one or multiples of the distance between the elements of the SLM.

Figure 4A:
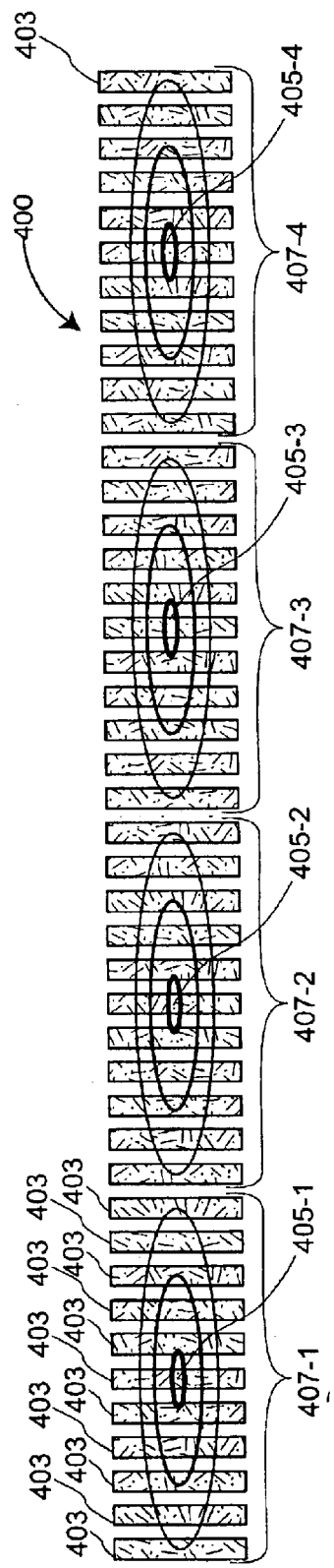
FIG. 4A shows some of the beams incident on the elements of the SLM, demonstrating how subsets of SLM elements each form a macro-cell to modulate each of the beams according to one embodiment of the invention.

One aspect of the invention provides much finer control of resolution by modulating each beam with not one but a plurality of elements of the SLM. In one embodiment, each of beams 213 from the beam multiplier is incident on a corresponding subset of a plurality of the reflective elements. FIG. 4A shows a set 400 of the elements 403 of the SLM 215. Four beams 405-1, 405-2, 4-5-3, and 4054 are shown incident on four subsets of the elements, shown as subsets 407-1, 407-2, 407-3, and 407-4, respectively. Each of the subsets forms a macro-cell of the SLM. Controlling each macro-cell involves controlling all the elements of a particular subset in unison. Such control of a macro-cell generates each modulated beam of the set of beams 219. FIG. 2 assumes that the SLM 215 includes electronics that cause each subset of elements of the SLM to move in unison in response to the corresponding one of modulating signals 217. Thus, each modulated beam has a corresponding subset of SLM elements controlled by one of the modulating signals 217.

Figure 4B:
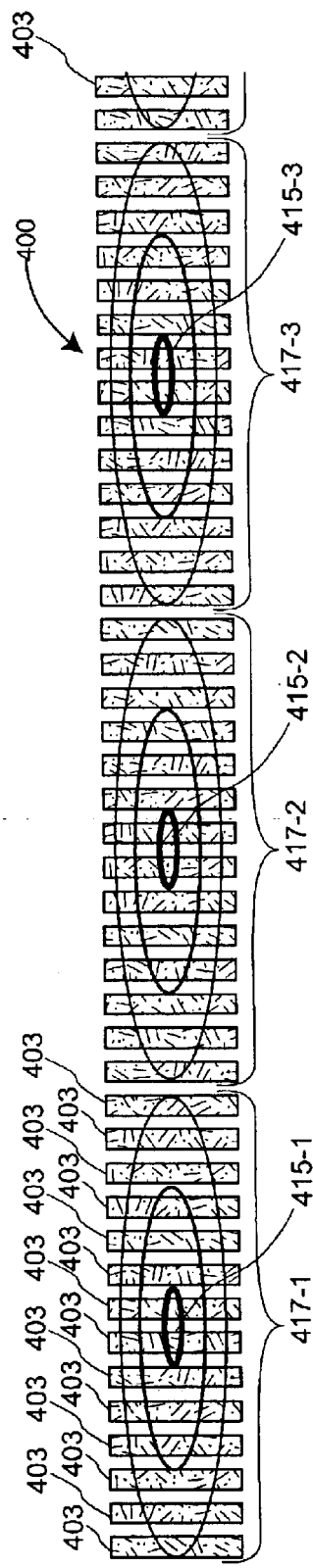
FIG. 4B shows how changing the separation of the beams also includes changing the number of SLM elements that form each macro-cell that modulates each of the beams according to one embodiment of the invention.

The distance between the beams on the imaging plane may be varied by varying the angles between the beams out of the beam multiplier 205. As shown in FIG. 4B, so changing the distance between the beams changes the number of SLM elements in each macro-cell that modulates each individual beam. FIG. 4B shows the same SLM elements 400 as shown in FIG. 4A, but now with beams that are wider and more widely separated on the active region, such that only three complete beams, 415-1, 415-2, and 415-3 fall on the shown part of the active region. Different subsets of the elements 403 form the macro-ells, shown as 417-1, 417-2, and 417-3, for modulating beams 415-1, 415-2, and 415-3, respectively.

The electronics between the modulating signals and the drivers of the SLM elements are configured such that adjusting the distance between the beams also adjusts which subsets of SLM elements form macro-cells. Each element in each subset is then modulated in unison by one of the modulating signals 217. The SLM 215 of FIG. 2 thus assumes that such driving electronics is included in the SLM 215.

One embodiment of system 200 is directed to exposing light sensitive flexographic plate material to create flexographic printing plates. While such an embodiment is now described in more detail, other embodiments may be used for other applications.

For the flexographic application, the laser beam source 201 is of a wavelength and energy to expose a flexographic plate. In particular, the laser beam source generates single-mode beam of infrared (IR) radiation.

One version uses a fiber laser that generates a TEM00 mode CW IR beam. One such laser is a fiber laser made by IPG Photonics Corporation, Oxford, Mass. One IPG laser that can be used operates at an output power of about 50W at a wavelength of 1080 nm. Another operates at a power of 100W. Yet another at a wavelength of 1600 nm.

An alternate embodiment operates with a laser beam source that generates a quasi-CW beam.

One embodiment of the beam multiplier 205 uses an acousto-optic deflector. Such deflectors are well known, and typically include a substantially transparent crystal whose index of refraction is varied periodically by causing a periodic sound wave to travel across the crystal by applying a radio-frequency (RF) signal to an included piezoelectric RF transducer. The periodic refraction pattern causes the crystal to act as a diffraction grating producing Bragg diffraction. The undiffracted laser beam is called the zero order laser beam and the primary diffracted beam is called the first order laser beam. In one embodiment, the first order beam is used for imaging. Alternate embodiments may use higher order beams.

By suitable orienting of the acousto-optic deflector, and selection of an RF frequency to apply to the transducer, a single beam may be directed in a particular direction. Unwanted beams are absorbed by one or more included beam dumps. Note that FIG. 2 does not show any of the beam dumps for the case of using an acousto-optic deflector for the beam multiplier. Those in the art would know to include, and where and how to include such beam dumps in the system 200.

To act as a beam multiplier, an acousto-optic deflector is fed with an RF signal that is decomposable as a sum of signals each at a distinct RF frequency. This generates a set of beams each deflected by an amount dependent on one of the RF frequencies.

In FIG. 2, the beam multiplier includes a acousto-optic deflector fed by an RF signal 207 decomposable as a sum of signals of distinct RF frequencies selected to provide the deflections appropriate for the distance between the beams on the imaging plane 223. The magnitudes of the signals from the beam multiplier are approximately equal, but may vary depending on the efficiency vs. frequency characteristics of the device of the device.

The acousto-optic deflector of beam multiplier 205 is made by AA Opto-Electronique, St. Remy Les Chevreuse, France. The number of beams is the order of eighty, so that the RF signal is decomposable to sum of eighty signals of eighty distinct frequencies selected to produce beams focussed at equidistant points on the imaging plane 223. In one embodiment, the eighty frequencies are centered around 75 MHz.

The distance between the focussed beams on the imaging plane is varied by changing the RF frequencies of the deflecting signal 207 applied to the beam multiplier 205. The arrangement of which elements from the macro-cells also is changed as described above and in FIGS. 4A and 4B.

In an alternate embodiment, the beam multiplier includes a diffractive beam sampler. Diffractive beam samplers are made by Gentec-EO Inc., Quebec City, Quebec, Canada, and also by Holo/Or Ltd., Kiryat Weizman, Rehovot, Israel. Such a diffractive beam sampler, for example, may be made as a diffractive phase grating of a Dammann type. A prescribed number of diffraction orders feature equal intensity, while the others orders are of negligible intensity.

In one embodiment the SLM is a one-dimensional multichannel MEM array made by Silicon Light Machines of Sunnyvale, Calif., part of Cypress Semiconductor Corporation of San Jose, Calif. Silicon Light Machines refers to its SLMs as Grating Light Valves (GLVs), and thus the term SLM will be understood to include a GLV.

FIGS. 5 and 6 each shows one embodiment of an imaging system that includes the elements of FIG. 2 together with a mechanism to provide relative motion between the modulated beams incident on the imaging plane and the recording medium. The relative motion provides for the system to simultaneously record a plurality of data tracks on the recording medium when the medium is at the imaging plane.

FIG. 5 shows an external drum imaging system 500, e.g., for imaging flexographic plate material that has been applied to an imaging sleeve. The system includes, in addition to the elements of FIG. 2, a rotatable external drum 503 on which the recording medium 507 is held using an imaging sleeve 505. Also included is a motor drive 509 for rotating the drum 503, thus providing the relative motion between the focussed beams and the recording medium. FIG. 5 is not in scale and may include other elements excluded from the description to not obscure the inventive aspects. Not shown, for example, is a mechanism to provide relative motion in a direction parallel to the axis of rotation of the drum 503.

While the same reference numerals are used in FIG. 5 as in FIG. 2, it would be understood by those in the art that system 500 would use elements adapted for use in such an external drum imaging system, while FIG. 2 shows a general system.

FIG. 6 shows an internal drum imaging system 600. The system 600 includes, in addition to the elements of FIG. 2, an inwardly curving platen having an inwardly curving internal surface 603 on which the recording medium is placed. The internal surface 603 has a circumferential direction 605 and a longitudinal direction 607. The imaging plane 223 is along the internal surface 603. The apparatus includes a mechanism to provide relative motion that moves the beams along the circumferential direction 605 of the inwardly curving surface. In one embodiment, the mechanism to provide the relative motion is multi-faced polygon 609 that causes the beams to move in the circumferential direction 605. Included is a motor drive 611 for rotating the polygon 609, thus providing the relative motion between the focussed beams and the recording medium.

FIG. 6 is also not in scale. The polygon, for example, is shown exaggerated, and with only six faces. Other elements are excluded from FIG. 6 and the description to not obscure the inventive aspects. Not shown, for example, is a mechanism to provide relative motion in the longitudinal direction 607.

The apparatuses described above each implement a method of imaging multiple tracks simultaneously. The method includes generating a single-mode beam of energy and directing said beam towards a beam multiplier, generating a set of single-mode beams using the beam multiplier onto which the beam of energy is directed, illuminating an SLM using the set of beams to form a set of modulated beams, and focussing the set of modulated beams onto an imaging plane at which a recording medium sensitive to imaging radiation may be placed. The recording medium is capable of being permanently marked in response to incidence of such imaging radiation. The method allows using diffraction-limited optics for the focussing.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of flexographic imaging, the invention is not limited to such context and may be utilized in various other applications and systems, for example in a system that uses light energy to expose photographic material, or another recording medium.

The invention is not limited to any one type of imaging architecture and method of imaging, and thus may be utilized in conjunction with one or a combination of other architectures. For example, the invention is not limited to imaging on a drum or on a curved surface, and may be adapted to imaging a planer recording medium by including the necessary optics to form beams along a flat planar surface. The imaging system, for example, may be used to expose printed circuit boards.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

I claim:

1. An apparatus comprising:
   a multichannel spatial light modulator (SLM) accepting a plurality of modulating signals and having an optically active region, the SLM having a number of modulating elements, the number greater than the number of modulating signals;
   a laser beam source operative to generate a single-mode laser beam of energy,
   a beam multiplier between the radiation source and the SLM operative to accept the single-mode beam and to generate from the beam a plurality of beams directed onto the SLM to illuminate the SLM's optically active region, such that the SLM generates a plurality of modulated beams modulated according to the modulating signals and wherein each of the plurality of beams from the beam multiplier illuminates a plurality of modulating elements each such plurality of elements controlled by a corresponding modulating signal; and
   a first optical subsystem including at least one optical element, located between the SLM and an imaging plane at which a recording medium sensitive to imaging radiation may be placed, the recording medium capable of being permanently marked in response to incidence of such imaging radiation, the first optical subsystem operative to focus the beams generated from the SLM onto the imaging plane,
   wherein the beams generated by the SLM when the SLM is illuminated are each from a plurality of elements of the SLM, and such that the first optical subsystem may be designed using diffraction-limited optics.

2. An apparatus as recited in claim 1, wherein the SLM is a reflective device that includes a plurality of reflective elements.

3. An apparatus as recited in claim 2, wherein the SLM is a MEM device.

4. An apparatus as recited in claim 1, wherein the SLM includes a plurality of elements distributed along a long axis, the apparatus further comprising:
   a second optical subsystem between the laser beam source and the SLM operative to elongate the cross-sectional distribution of each of the beams in the direction of the SLM's long axis, such that each beam incident on the SLM has a cross-sectional distribution with a short axis and a long axis, each beam's long axis parallel to the SLM's long axis, and such that the beams are distributed in the direction of the SLM's long axes.

5. An apparatus as recited in claim 4, wherein the second optical subsystem includes at least one cylindrical lens.

6. An apparatus as recited in claim 4, wherein the second optical subsystem includes an array of lenslets.

7. An apparatus as recited in claim 1, wherein the SLM is a reflective device that includes a plurality of reflective elements, and
   wherein each beam from the beam multiplier is incident on a corresponding subset of the reflective elements, such that modulating the reflective elements of a particular subset of elements in unison generates the modulated beam corresponding to the particular subset of SLM elements.

8. An apparatus as recited in claim 7, wherein the distance between the focussed beams on the imaging plane may be varied by changing the angles between each of the beams from the beam multiplier.

9. An apparatus as recited in claim 1, wherein the SLM is a reflective device having a set of reflective elements, and wherein the focussed distance between the focussed beams on the imaging plane may be varied by changing the angles between each of the beams from the beam multiplier.

10. An apparatus as recited in claim 1, wherein the laser beam source is a fiber laser that generates a TEM00 mode beam.

11. An apparatus as recited in claim 1, wherein the laser beam source generates a CW beam.

12. An apparatus as recited in claim 1, wherein the laser beam source generates a quasi-CW beam.

13. An apparatus as recited in claim 1, wherein the laser beam source is of a wavelength and energy to expose a flexographic plate, and wherein the recording medium includes flexographic plate material.

14. An apparatus as recited in claim 1, farther comprising:
   a mechanism to provide relative motion between the modulated beams incident on the imaging plane and the recording medium, such that the apparatus is operative to simultaneously record a plurality of data tracks on the recording medium when the medium is at the imaging plane.

15. An apparatus as recited in claim 14, further comprising:
   a rotatable external drum on which the recording medium is held, wherein the mechanism to provide relative motion rotates the drum.

16. An apparatus as recited in claim 14, further comprising:
   an inwardly curving platen having an inwardly curving internal surface on which the recording medium is placed, the curving internal surface having a circumferential direction and a longitudinal direction, wherein the imaging plane is along the internal surface, and wherein the mechanism to provide relative motion moves the beams along the circumferential direction of the inwardly curving surface.

17. An apparatus as recited in claim 1, wherein the beam multiplier includes an acousto-optic deflector.

18. An apparatus as recited in claim 17, wherein the acousto-optic deflector is fed by an RF signal decomposable as a sum of signals each at a distinct RF frequency, each deflected beam deflected by an amount dependent on one of the RF frequencies.

19. An apparatus as recited in claim 1, wherein the beam multiplier includes a diffractive beam sampler.

20. A method of imaging comprising:
   generating a single-mode beam of energy and directing said beam towards a beam multiplier;
   generating a set of single-mode beams using said beam multiplier onto which is directed said beam of energy;
   illuminating an optically active region of a multichannel spatial light modulator (SLM) using said set of beams to form a set of modulated beams, the SLM having a number of modulating elements, the number greater than the number of modulated beams in the set, such that each of the plurality of beams from the beam multiplier illuminates a plurality of modulating elements; and
   focussing said set of modulated beams onto an imaging plane at which a recording medium sensitive to imaging radiation may be placed, the recording medium capable of being permanently marked in response to incidence of such imaging radiation,
such that diffraction-limited optics can be used for said focussing.

21. A method as recited in claim 20, wherein the SLM is a reflective device that includes a plurality of reflective elements.

22. A method as recited in claim 21, wherein the SLM is a MEM device.

23. A method as recited in claim 20, wherein the SLM includes a plurality of elements distributed along a long axis, the method further comprising:
   elongating the cross-sectional distribution of each of the beams in the direction of the SLM's long axis, such that each beam incident on the SLM has a cross-sectional distribution with a short axis and a long axis, each beam's long axis parallel to the SLM's tong axis, and such that the beams are distributed in the direction of the SLM's long axes.

24. A method as recited in claim 20, wherein the SLM is a reflective device that includes a plurality of reflective elements, and
wherein each beam from the beam multiplier is incident on a corresponding subset of the reflective elements, such that modulating the reflective elements of a particular subset of elements in unison generates the modulated beam corresponding to the particular subset of SLM elements.

25. A method as recited in claim 24, wherein the distance between the focussed beams on the imaging plane may be varied by changing the angles between each of the beams from the beam multiplier.

26. A method as recited in claim 20, wherein generating a single-mode beam generates a CW beam.

27. A method as recited in claim 20, wherein generating a single-mode beam generates a quasi-CW beam.

28. A method as recited in claim 20, wherein the laser bean source is of a wavelength and energy to expose a flexographic plate, and wherein the recording medium includes flexographic plate material.

29. A method as recited in claim 20, further comprising:
   generating relative motion between the modulated beams incident on the imaging plane and the recording medium,
such that the method simultaneously records a plurality of data tracks on the recording medium.

30. A method as recited in claim 20, wherein the beam multiplier includes an acousto-optic deflector.

31. A method as recited in claim 30, further comprising feeding the acousto-optic deflector with an RF signal decomposable as a sum of signals each at a distinct RF frequency, each deflected beam deflected by an amount dependent on one of the RF frequencies.

32. A method as recited in claim 20, wherein the beam multiplier includes a diffractive beam sampler.

33. A method of generating a plurality of modulated beams for imaging onto a recording medium that has a light sensitive surface, the method comprising:
   using a beam multiplier that receives a single-mode beam and generates a plurality of beams to illuminate a spatial light modulator that modulates the beams, the spatial light modulator having a plurality of modulating elements, each beam of the multiplier illuminating more than one of the plurality of modulating beams,
wherein the beams are each substantially single-mode such that diffraction-limited optics may be used to focus the modulated beams onto the radiation sensitive surface of the recording medium.

34. An optical recording apparatus comprising:
   a multichannel spatial light modulator (SLM) that includes a plurality of optical elements that are micromachined silicon elements;
   an acousto-optic beam deflector configured to deflect a beam simultaneously at a multiple set of angles such that the deflector generates a set of beams from a single incident beam;
   a radiation source operative to emit a beam of single-mode radiation towards the acousto-optic beam deflector, such that the acousto-optic beam deflector generates a set of beams;
   an optical subsystem that includes at least one optical element, said optical subsystem configured to direct the set of beams from acousto-optic beam deflector onto the SLM; and
   imaging optics configured to receive radiation from the SLM and focus it onto a recording medium so as to record data thereon, such that the SLM generates a set of modulated beams that when relative motion is provided between the modulated beams and the recording medium to generate multiple tracks onto the recording medium.

35. An apparatus as recited in claim 34, wherein the modulated beams are substantially single-mode such that diffraction-limited optics may be used for the design of the imaging optics.

* * * * *

UNITED STATES PATENT AND TRADEMARK OFFICE
CERTIFICATE OF CORRECTION

PATENT NO. : 6,873,398 B2
DATED : March 29, 2005
INVENTOR(S) : Sievers

It is certified that error appears in the above-identified patent and that said Letters Patent is hereby corrected as shown below:

Column 9,
Line 46, kindly change "tong axis," to -- long axis, --.

Column 10,
Line 4, kindly change "bean source" to -- beam source --.

Signed and Sealed this

Thirty-first Day of May, 2005

JON W. DUDAS
*Director of the United States Patent and Trademark Office*